(12) United States Patent
Lee et al.

(10) Patent No.: US 9,075,467 B2
(45) Date of Patent: Jul. 7, 2015

(54) TOUCH PANEL

(71) Applicants: Wu-Hsieh Lee, Hsin-Chu (TW);
Wei-Cheng Huang, Hsin-Chu (TW);
Chwen-Tay Hwang, Hsin-Chu (TW)

(72) Inventors: Wu-Hsieh Lee, Hsin-Chu (TW);
Wei-Cheng Huang, Hsin-Chu (TW);
Chwen-Tay Hwang, Hsin-Chu (TW)

(73) Assignee: Young Lighting Technology Inc.,
Hsin-Chu (TW)

( * ) Notice: Subject to any disclaimer, the term of this patent is extended or adjusted under 35 U.S.C. 154(b) by 122 days.

(21) Appl. No.: 13/953,762

(22) Filed: Jul. 30, 2013

(65) Prior Publication Data

US 2014/0062920 A1 Mar. 6, 2014

(30) Foreign Application Priority Data

Sep. 3, 2012 (TW) .............................. 101132026 A

(51) Int. Cl.
*G06F 3/041* (2006.01)
*G06F 3/0488* (2013.01)
*G06F 3/147* (2006.01)
*G06F 3/045* (2006.01)

(52) U.S. Cl.
CPC .............. *G06F 3/041* (2013.01); *G06F 3/0488* (2013.01); *G06F 3/147* (2013.01); *G06F 3/045* (2013.01); *G06F 2203/04103* (2013.01)

(58) Field of Classification Search
None
See application file for complete search history.

(56) References Cited

U.S. PATENT DOCUMENTS

2012/0004012 A1* 1/2012 Hamblin et al. .............. 345/174

FOREIGN PATENT DOCUMENTS

| CN | 102122223 | 7/2011 |
| TW | M324212 | 12/2007 |
| TW | I320114 | 2/2010 |
| TW | I348636 | 9/2011 |
| TW | 201203036 | 1/2012 |
| TW | I368079 | 7/2012 |

OTHER PUBLICATIONS

"Office Action of Taiwan Counterpart Application", issued on Jul. 15, 2014, p. 1-p. 4, in which the listed references were cited.

* cited by examiner

*Primary Examiner* — Muhammad N Edun
(74) *Attorney, Agent, or Firm* — Jianq Chyun IP Office

(57) ABSTRACT

A touch panel including a transparent substrate, a touch module and a flexible circuit board is provided. The touch module is disposed on the transparent substrate. The flexible circuit board has a bonding segment, a bending segment and extending segment. The bonding segment is bonded to the touch module. The bending segment is located between the bonding segment and the extending segment. The bending segment has a bending line, and the bending segment is bended along the bending line.

8 Claims, 10 Drawing Sheets

TOUCH PANEL

CROSS-REFERENCE TO RELATED APPLICATION

This application claims the priority benefit of Taiwan application serial no. 101132026, filed on Sep. 3, 2012. The entirety of the above-mentioned patent application is hereby incorporated by reference herein and made a part of this specification.

BACKGROUND OF THE INVENTION

1. Field of the Invention

The invention provides a touch panel.

2. Description of Related Art

As information technology, wireless mobile communication and information appliances have been rapidly developed and applied, various information products have changed from using conventional input devices such as key boards or mice to using touch panels. Touch panels may be generally classified into resistive touch panels and the capacitive touch panel.

A touch panel usually achieves signal transmission through a flexible circuit board, regardless of whether it is applied on a large flat-panel display (e.g., computer displays, all-in-one computer and televisions) or a handheld device having small display panel (e.g., smart phones and tablet computers). FIG. 10 illustrates a schematic diagram of a conventional touch display device 20, in which a space for bending a flexible circuit board existed between a frame 21 and a touch panel 22 or a touch panel 23.

China patent publication no. 102122223A discloses a connecting relation between a flexible circuit board and a touch panel. Taiwan patent publication no. 201203036 discloses a flexible circuit board which bends from a lateral side of a touch panel to a back side of the touch panel. Taiwan patent no. 1320114 discloses a method of reducing bending stress of a flexible circuit board by utilizing openings.

SUMMARY OF THE INVENTION

The invention is directed to a touch panel, which may reduce the width of the frame of the touch display device.

Other objects and advantages of the invention can be further illustrated by the technical features broadly embodied and described as follows.

In order to achieve one or a part of or all of the above advantages or other advantages, an embodiment of the present invention provides a touch panel, including a transparent substrate, a touch module and a flexible circuit board. The touch module is disposed on the transparent substrate. The flexible circuit board has a bonding segment, a bending segment and extending segment. The bonding segment is bonded to the touch module. The bending segment is located between the bonding segment and the extending segment. The bending segment has a bending line, and the bending segment is bended along the bending line.

According to the touch panel of an embodiment of the invention, in which the extending segment is extended towards a direction away from the transparent substrate.

According to the touch panel of an embodiment of the invention, in which the bending segment has at least an opening, and the opening is located on the bending line.

The touch panel of an embodiment of the invention further includes a bending member fastened to the bending segment, in which the bending member ensures the bending segment bends along the bending line.

According to the touch panel of an embodiment of the invention, in which the touch module includes at least a transparent electrode layer, at least a transparent bearing layer and at least a transparent adhesive layer, the transparent electrode layer is disposed on a surface of the transparent bearing layer, and the bonding segment is sandwiched between the transparent bearing layer and the transparent adhesive layer.

According to the touch panel of an embodiment of the invention, in which the touch module further includes an explosion-proof film, the explosion-proof film is adhered on the transparent electrode layer, the transparent bearing layer and a portion of the bending segment through the transparent adhesive layer.

The touch panel of an embodiment of the invention further includes a bending member fastened to the bending segment, and a portion of the bending member is sandwiched between the transparent bearing layer and the transparent adhesive layer, wherein the bending member ensures the bending segment bends along the bending line.

According to the touch panel of an embodiment of the invention, in which an orthographic projection of the touch module on the transparent substrate is located within an edge profile of the transparent substrate, and a distance is existed between a lateral side of the orthographic projection of the touch module on the transparent substrate and a corresponding lateral side of the transparent substrate.

According to the touch panel of an embodiment of the invention, in which the touch module has a touch panel view area and a touch panel active area, the bonding segment has an orthographic projection on the touch module, a portion of the orthographic projection of the bonding segment on the touch module is located within the touch panel active area, and the orthographic projection of the bonding segment on the touch module is located outside of the touch panel view area.

In summary, the embodiments of the invention have at least the following advantages: According to above embodiments of the invention, by bending the bending segment of the flexible circuit board along the bending line to reduce the space required for edges of touch panel, the width of the frame of the touch display device may be substantially reduced.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
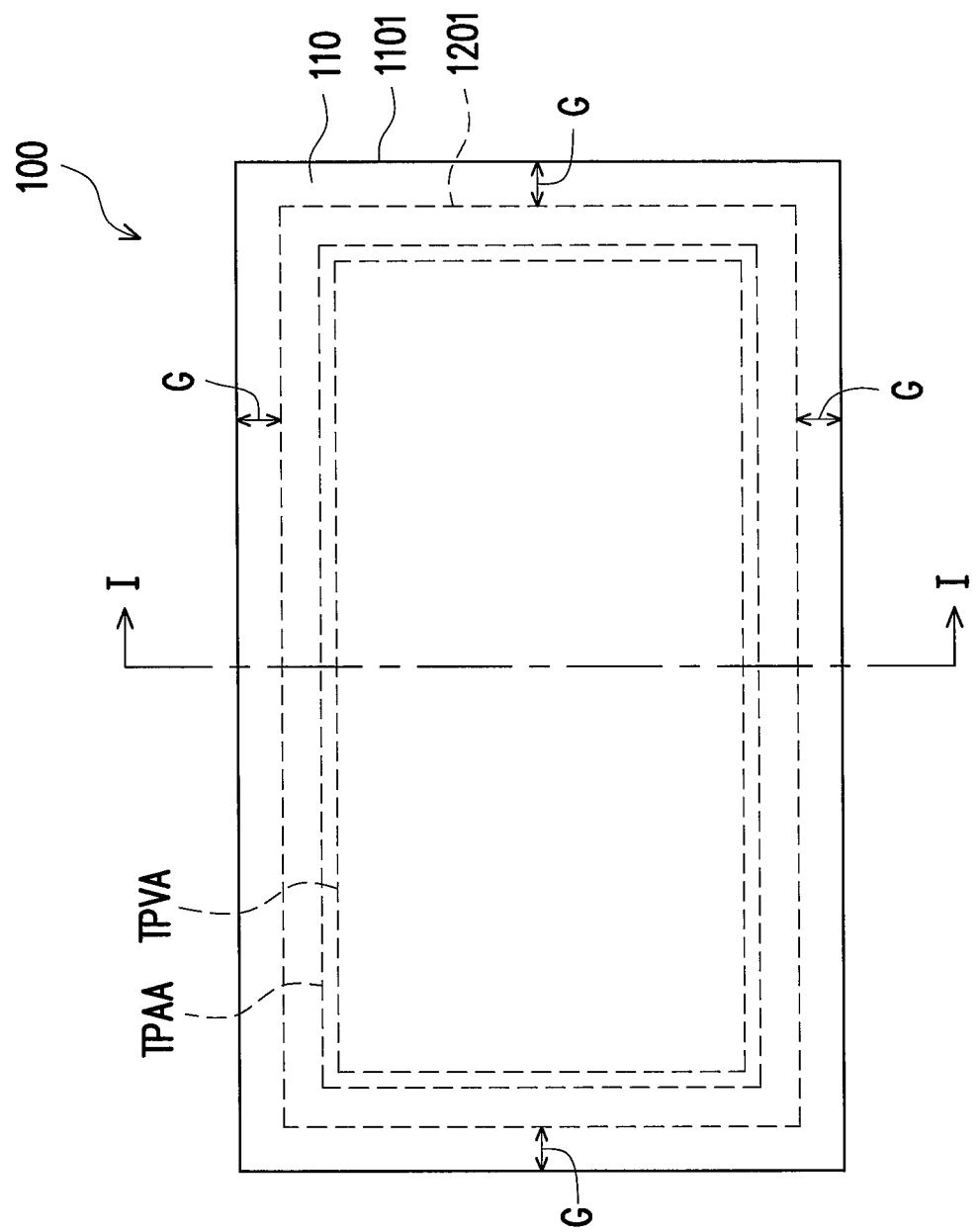
FIG. 1 is a front view illustrating a touch panel according to an embodiment of the invention.
Figure 2:
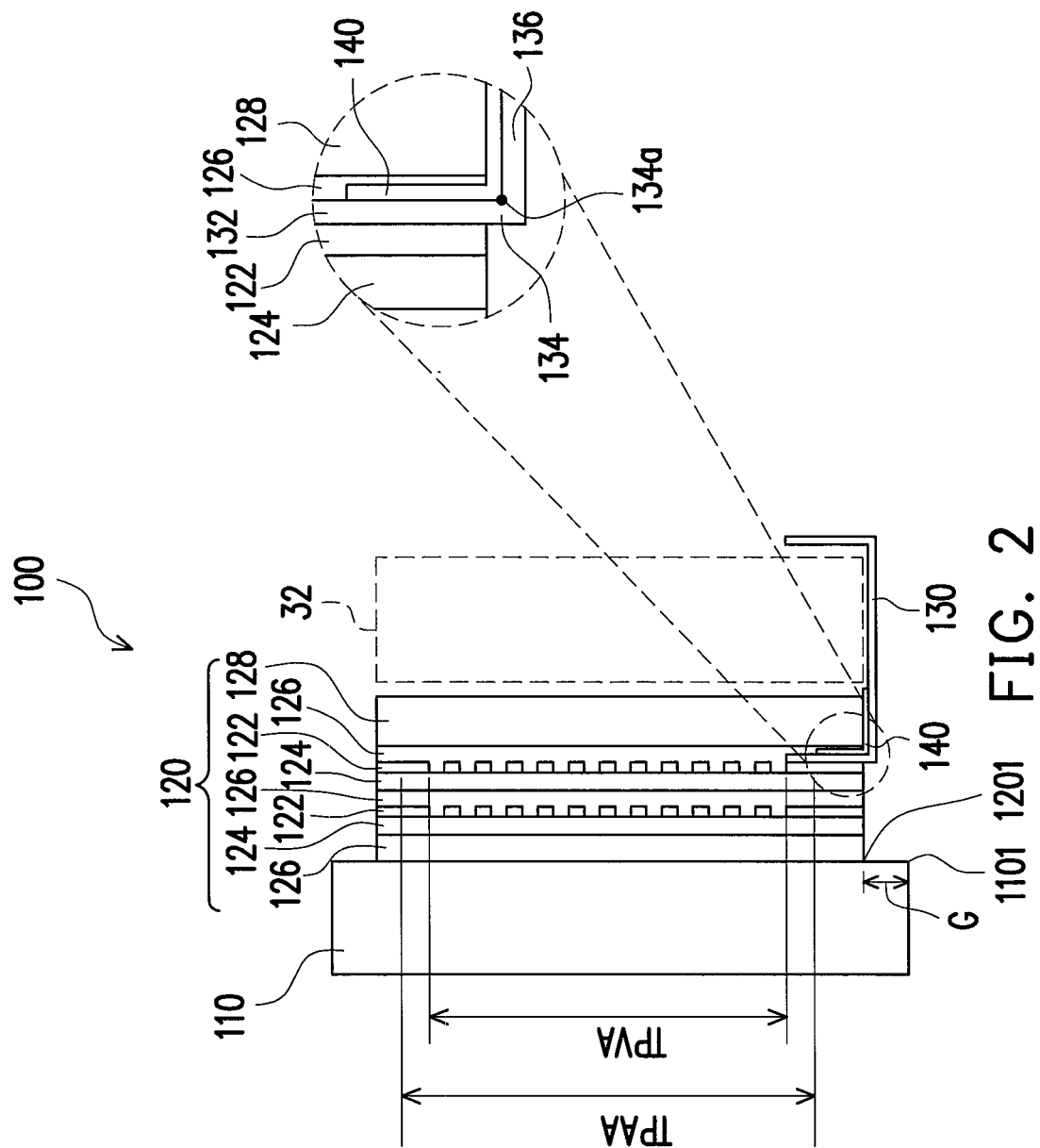
FIG. 2 is a cross-sectional view illustrating the touch panel of FIG. 1 along a sectional line I-I.

FIG. 1 is a front view illustrating a touch panel according to an embodiment of the invention. FIG. 2 is a cross-sectional view illustrating the touch panel of FIG. 1 along a sectional line I-I. Referring to FIG. 1 and FIG. 2, the touch panel 100 of the present embodiment may be applied as a display panel 32, and an operating interface may be provided using the display panel 32. The touch panel 100 includes a transparent substrate 110, a touch module 120 and a flexible circuit board 130. The touch module 120 is disposed on the transparent substrate 110, and the touch module 120 may be a resistance touch module or a capacitive touch module. The flexible circuit board 130 is connected to the touch module 120 to provide signal transmission.

In the present embodiment, the flexible circuit board 130 has a bonding segment 132, a bending segment 134 and an extending segment 136, in which the bonding segment 132 is bonded to the touch module 120, the bending segment 134 is located between the bonding segment 132 and the extending segment 136, and the extending segment 136 is extended in a direction away from the transparent substrate 110. The flexible circuit board 130 has an internal circuit pattern (not illustrated) distributed on the bonding segment 132, the bending segment 134 and the extending segment 136. The bending segment 134 of the flexible circuit board 130 may include a bending line 134a, and the bending segment 134 is bended along the bending line 134a. A bending angle of the bending segment 134 may substantially be 90 degrees.

Figure 3:
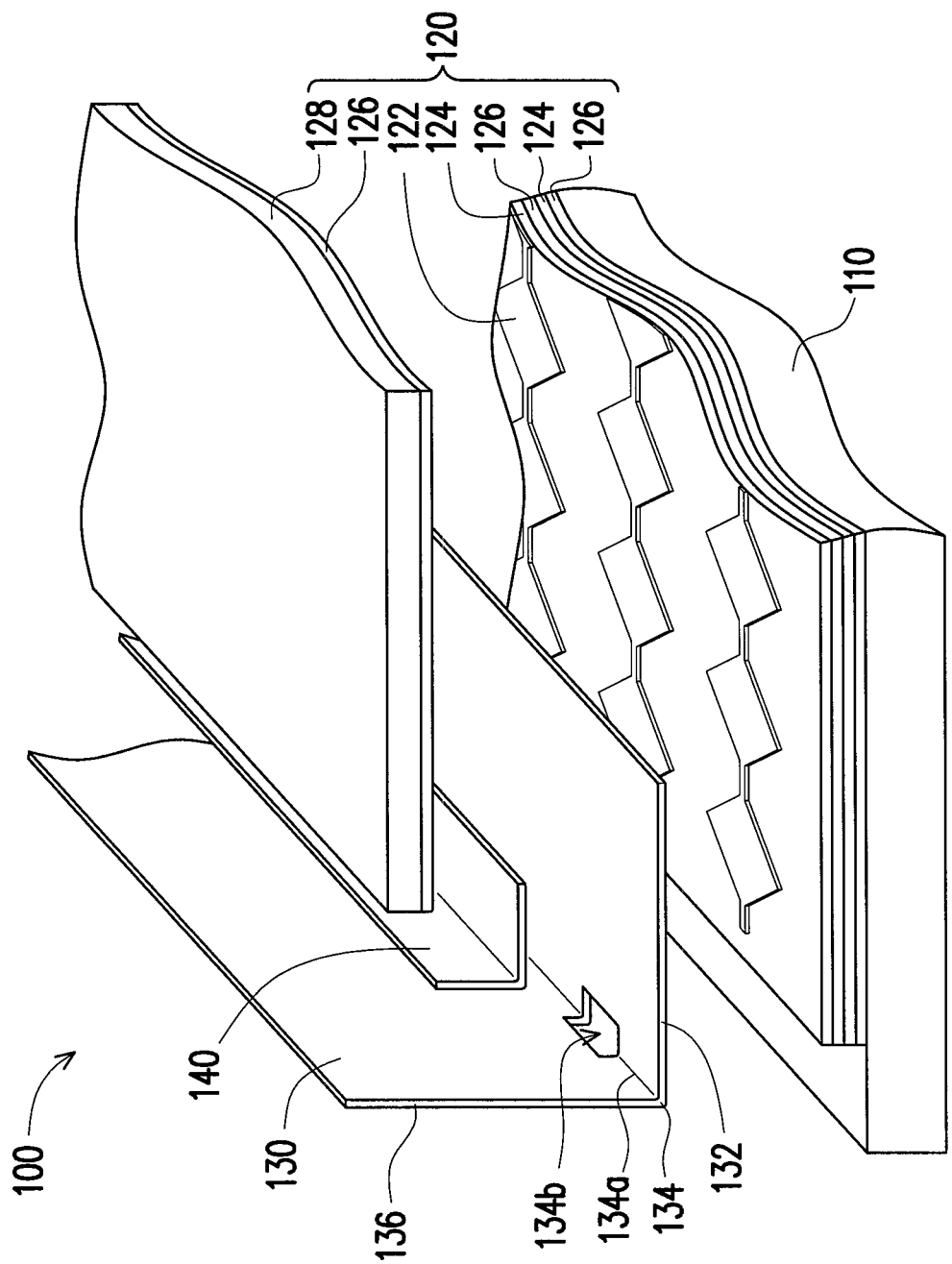
FIG. 3 is a partial exploded view illustrating the touch panel in FIG. 1.
Figure 4:
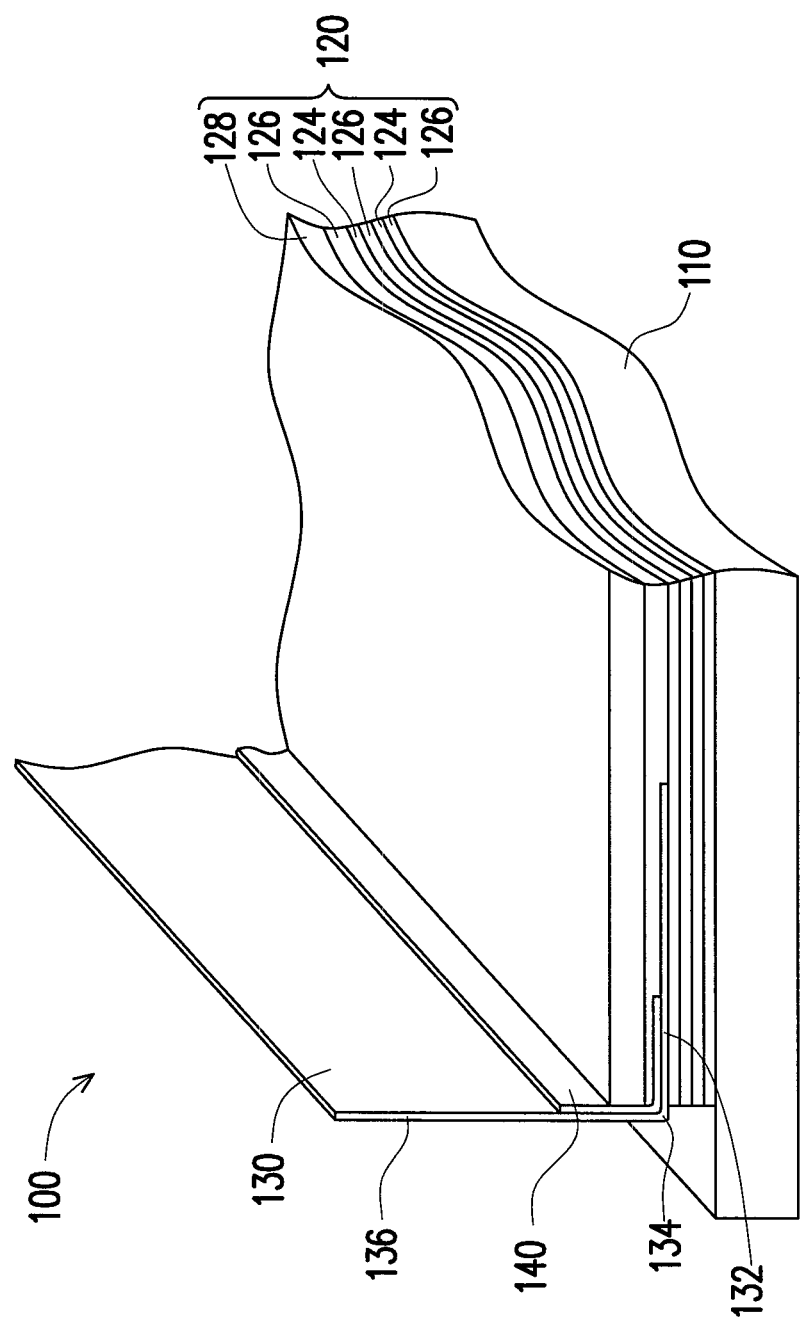
FIG. 4 is a partial perspective view illustrating the touch panel of FIG. 1.

FIG. 3 is a partial exploded view illustrating the touch panel of FIG. 1. FIG. 4 is a partial perspective view illustrating the touch panel of FIG. 1. Referring to FIG. 1 to FIG. 4, according to the present embodiment, in order to ensure that the bending segment 134 is bended along the bending line 134a, a forming method (e.g., thermoforming) may be used to process the bending segment 134 so that no stress or less stress may be remained on where the bending segment 134 is bended. In addition, to ensure that the bending segment 134 is bended along the bending line 134a, the touch panel 100 may further includes a bending member 140 according to another embodiment of the invention, the bending member 140 is fastened to the bending segment 134. The bending member 140 may be a metal member having a structure independent from the flexible circuit board 130 or a plastic member adhered to the bending member 134. The invention may reduce deformation of the bending segment 134 by thermoforming the bending segment 134 or the bending member 140 so that no stress or less stress may be remained, thereby avoiding the bending segment 132 of the flexible circuit board 130 from being detached.

Referring to FIG. 3, according to another embodiment of the invention, in order to reduce the stress of the bending segment 134 on the bending line 134a, the bending segment 134 may include one or more openings 134b, and the openings 134b traverse the bending line 134a. By reducing the stress of the bending segment 134 on the bending line 134a through the openings 134b, the process of bending the bending segment 134 along the bending line 134a may be ensured.

Referring to FIG. 1 and FIG. 2, an orthographic projection 1201 of the touch module 120 on the transparent substrate 110 is located within an edge profile 1101 of the transparent substrate 110, and a distance G is existed between a lateral side of the orthographic projection 1201 of the touch module 120 on the transparent substrate 110 and a corresponding lateral side of the transparent substrate 110. Therefore, a housing of a device applying the touch panel 100 may be propped against or connected to edges of the transparent substrate 110.

Referring to FIG. 1 and FIG. 2, the touch module 120 includes a touch panel view area TPVA and a touch panel active area TPAA, a portion of an orthographic projection of the bending segment 132 of the flexible circuit board 130 on the touch module 120 is located within the touch panel active area TPAA, and the orthographic projection of the bending segment 132 on the touch module 120 is located outside of the touch panel view area TPVA.

Referring to FIG. 2 to FIG. 4, the touch module 120 includes at least a transparent electrode layer 122, at least a transparent bearing layer 124 and at least a transparent adhesive layer 126, the transparent electrode layer 122 is disposed on a surface of the transparent bearing layer 124. In the present embodiment, the touch module 120 includes a plurality of transparent electrode layers 122, a plurality of transparent bearing layers 124 and a plurality of transparent adhesive layers 126. The transparent electrode layers 122 are respectively disposed on a surface of the transparent bearing layers 124, and the transparent bearing layers 124 are adhered to each other and the transparent substrate 110 through the transparent adhesive layers 126. For the flexible circuit board 130, in which at least a portion of the bonding segment 132 is electrically connected to the transparent electrode layer 122. The bonding segment 132 and a portion of the bending member 140 of the flexible circuit board 130 are sandwiched between the transparent bearing layer 124 and the transparent adhesive layer 126. More specifically, the bonding segment 132 and the portion of the bending member 140 are disposed between the transparent electrode layer 122 and the transparent adhesive layer 126.

Referring to FIG. 2 to FIG. 4, according to the present embodiment, in order to protect the transparent electrode layer 122 located farthest away from the transparent substrate 110, the touch module 120 further includes an explosion-proof film 128, and the explosion-proof film 128 is adhered on the transparent electrode layer 122, the transparent bearing layer 124 and a portion of the bonding segment 132 through the transparent adhesive layer 126.

Figure 5:
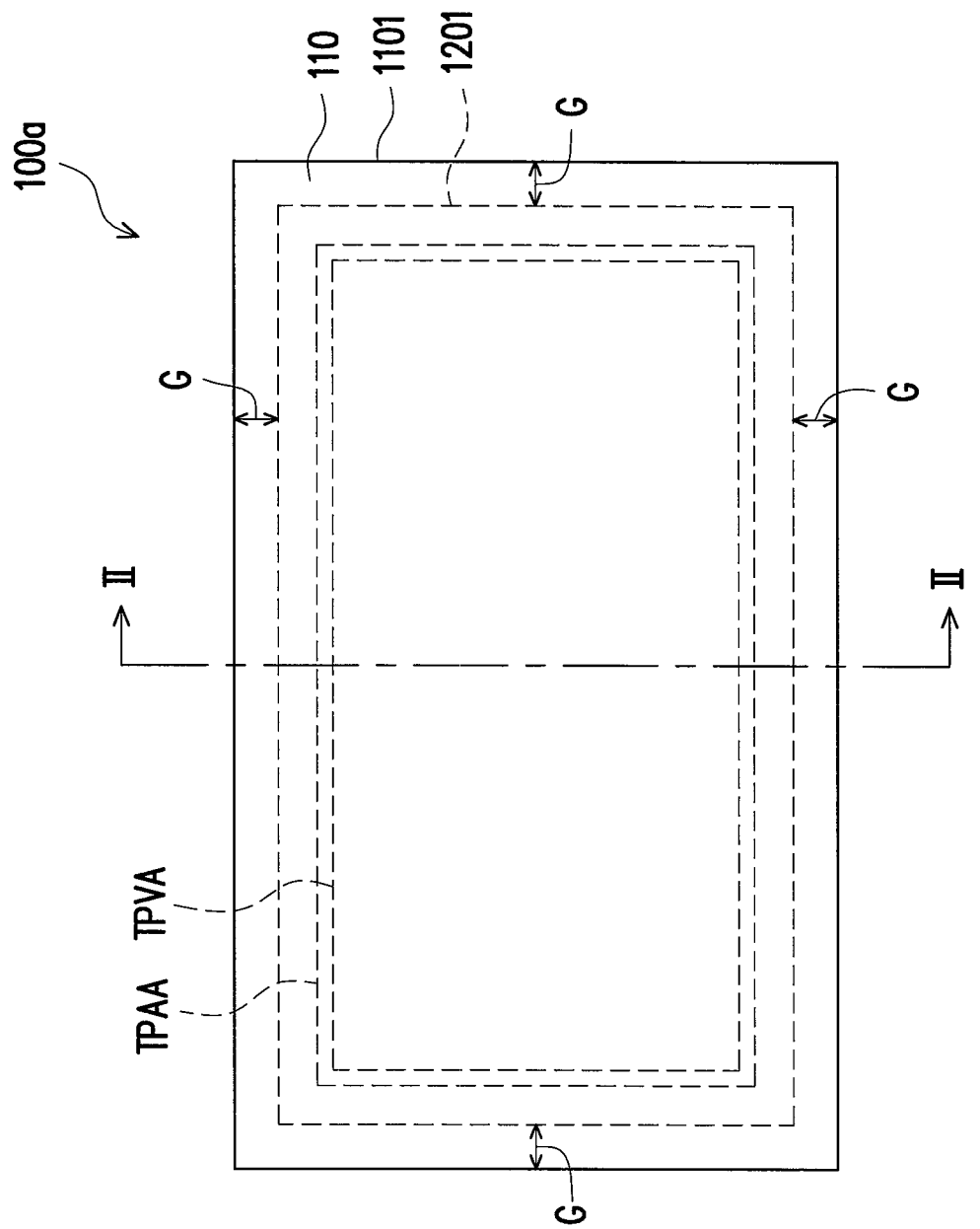
FIG. 5 is a schematic diagram illustrating a touch panel according to another embodiment of the invention.
Figure 6:
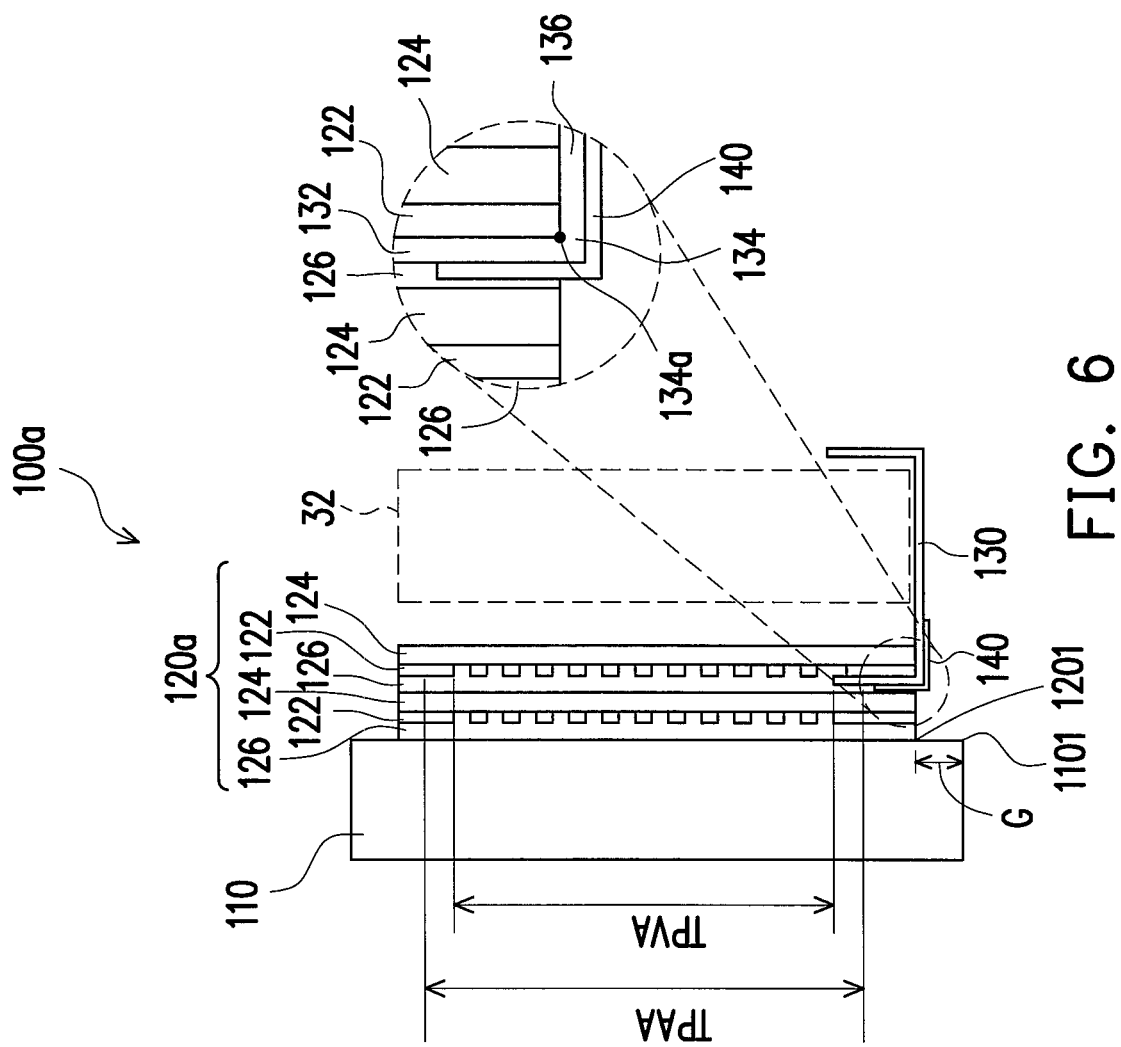
FIG. 6 is a cross-sectional view illustrating the touch panel of FIG. 5 along a sectional line II-II.
Figure 7:
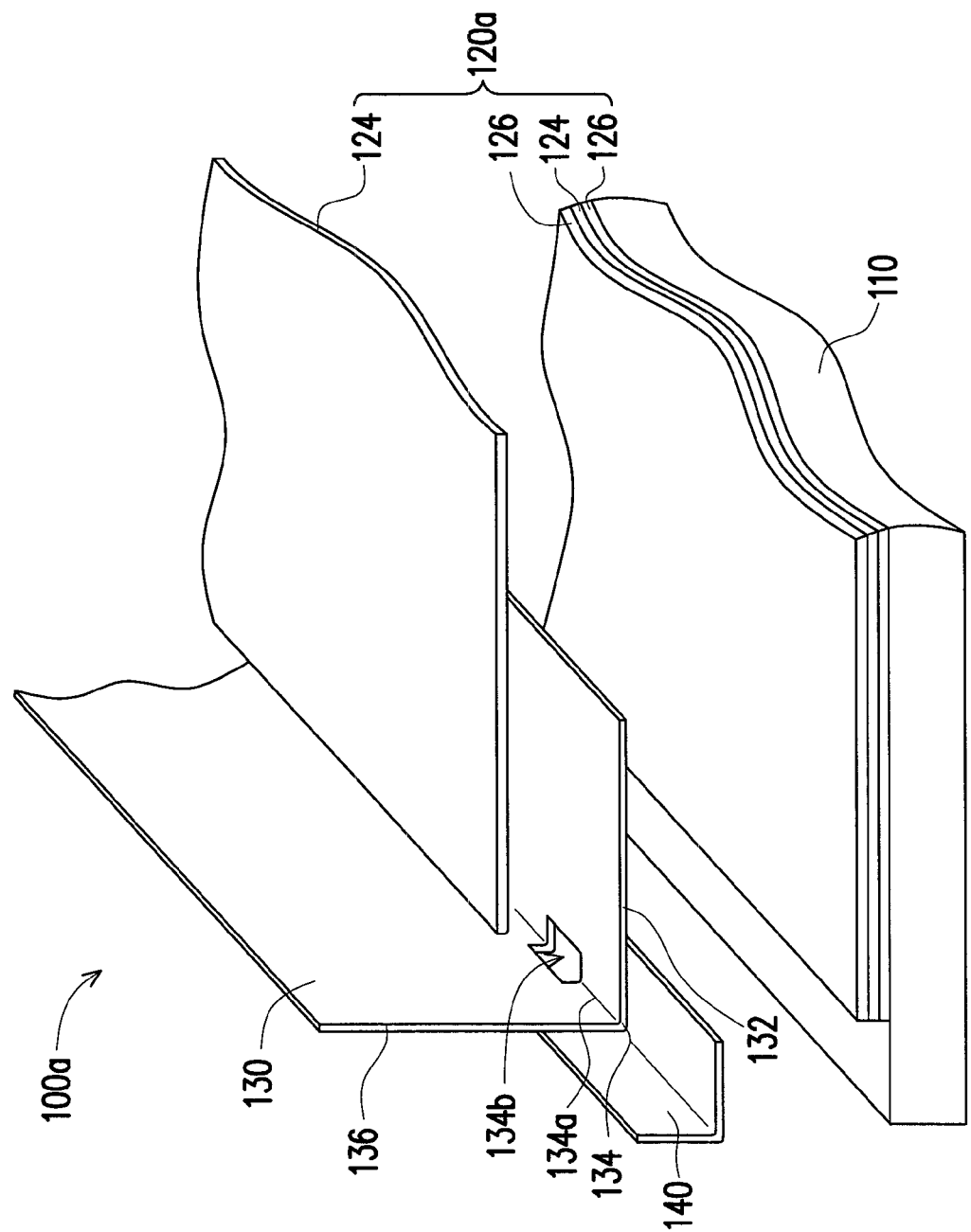
FIG. 7 is a partial exploded view illustrating the touch panel of FIG. 5.
Figure 8:
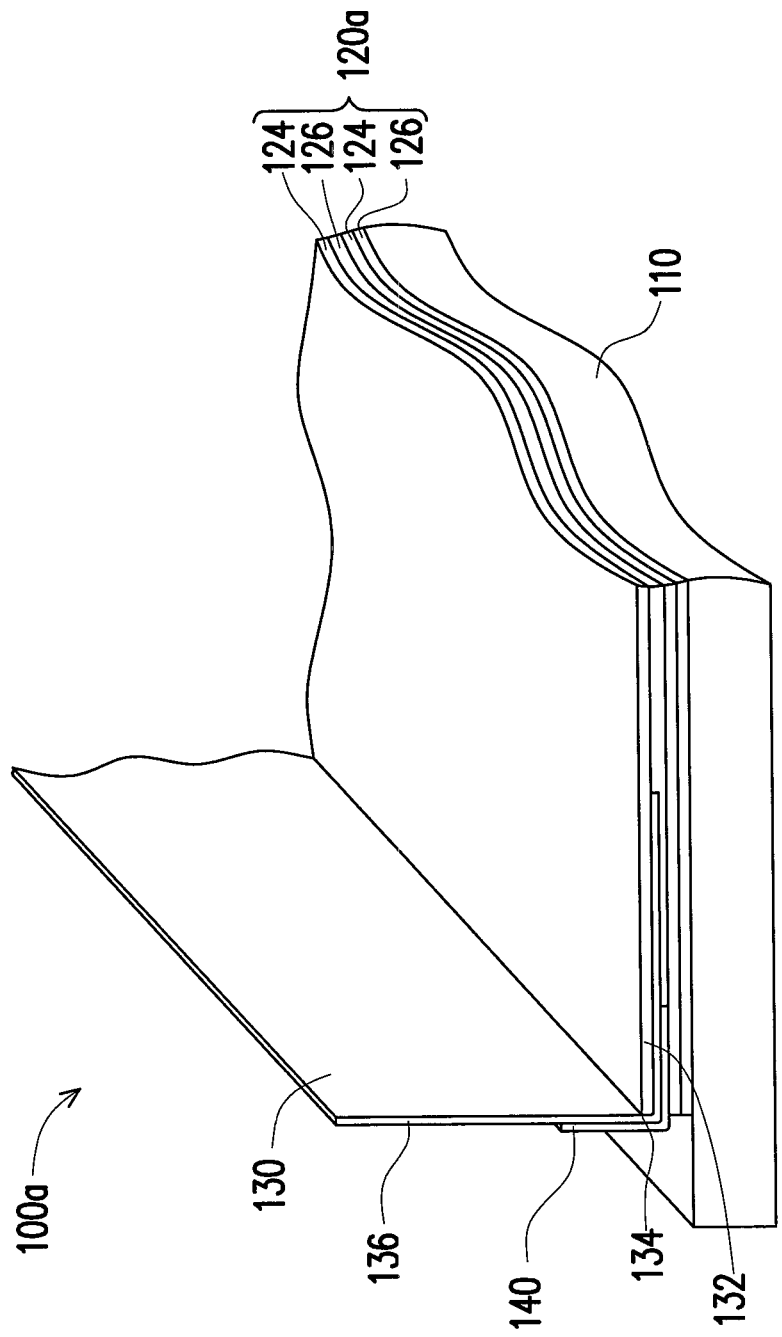
FIG. 8 is a partial perspective view illustrating the touch panel of FIG. 5.

FIG. 5 is a schematic diagram illustrating a touch panel according to another embodiment of the invention. FIG. 6 is a cross-sectional view illustrating the touch panel of FIG. 5 along a sectional line II-II. FIG. 7 is a partial exploded view illustrating the touch panel of FIG. 5. FIG. 8 is a partial perspective view illustrating the touch panel of FIG. 5. Referring to FIG. 5 to FIG. 8, the major difference between the touch panel 100a of the present embodiment and the touch panel 100 of FIG. 2 lies where the explosion-proof film 128 of the touch panel 100 in FIG. 2 is omitted in the touch panel 100a of the present embodiment.

More specifically, when the touch module 120a of the touch panel 100a is disposed on the transparent substrate 110, the transparent electrode layer 122 (which is farthest away from the transparent substrate 110) is disposed on a surface of the transparent bearing layer 124 towards the transparent substrate 110 and without being exposed to the outside. Therefore, the explosion-proof film 128 of FIG. 2 may be omitted in the present embodiment. In this, the bonding segment 132 and a portion of the bending member 140 of the flexible circuit board 130 are sandwiched between the transparent bearing layer 124 and the transparent adhesive layer 126. More specifically, the bonding segment 132 and the portion of the bending member 140 are disposed between the transparent electrode layer 122 and the transparent adhesive layer 126 as shown in FIG. 6.

Figure 9:
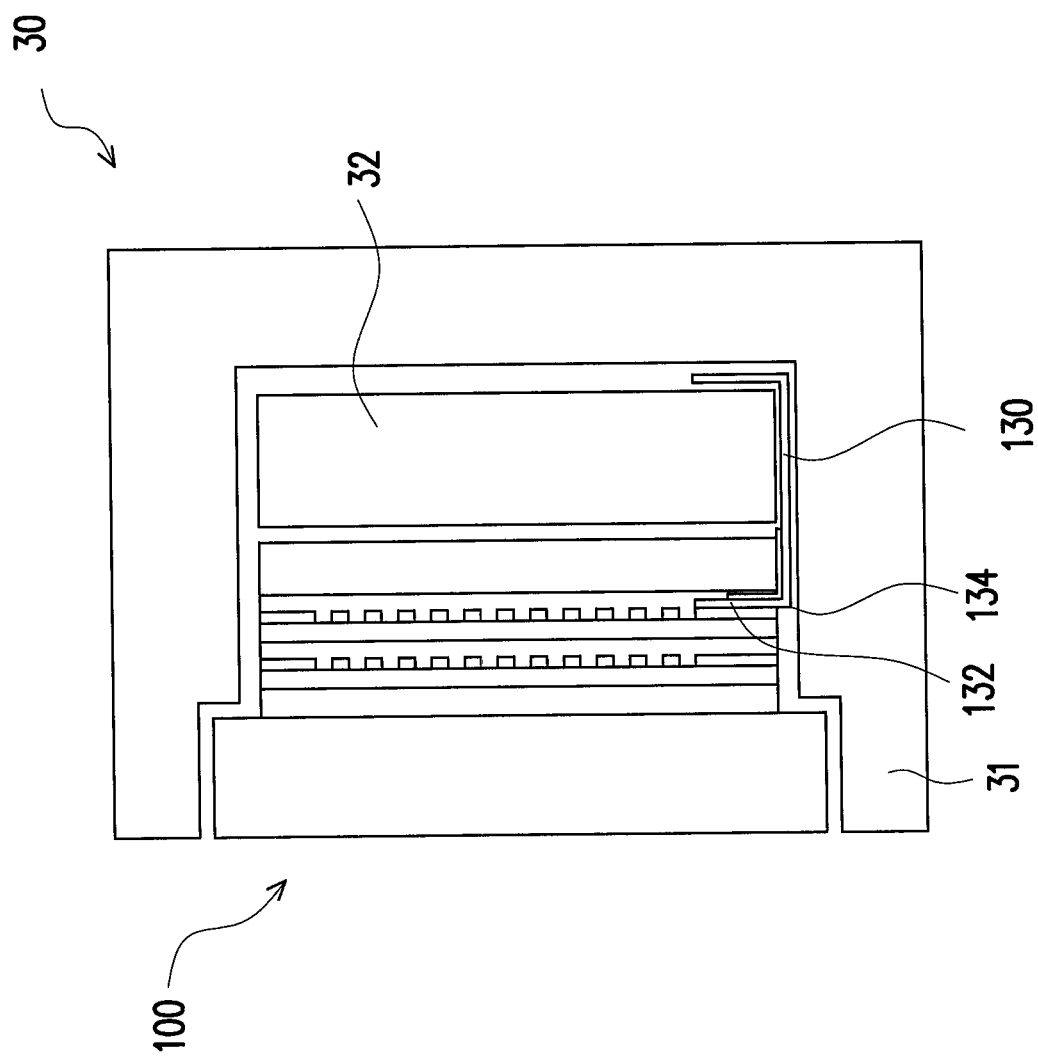
FIG. 9 is a schematic diagram illustrating a touch panel placed within a frame according to another embodiment of the invention.
Figure 10:
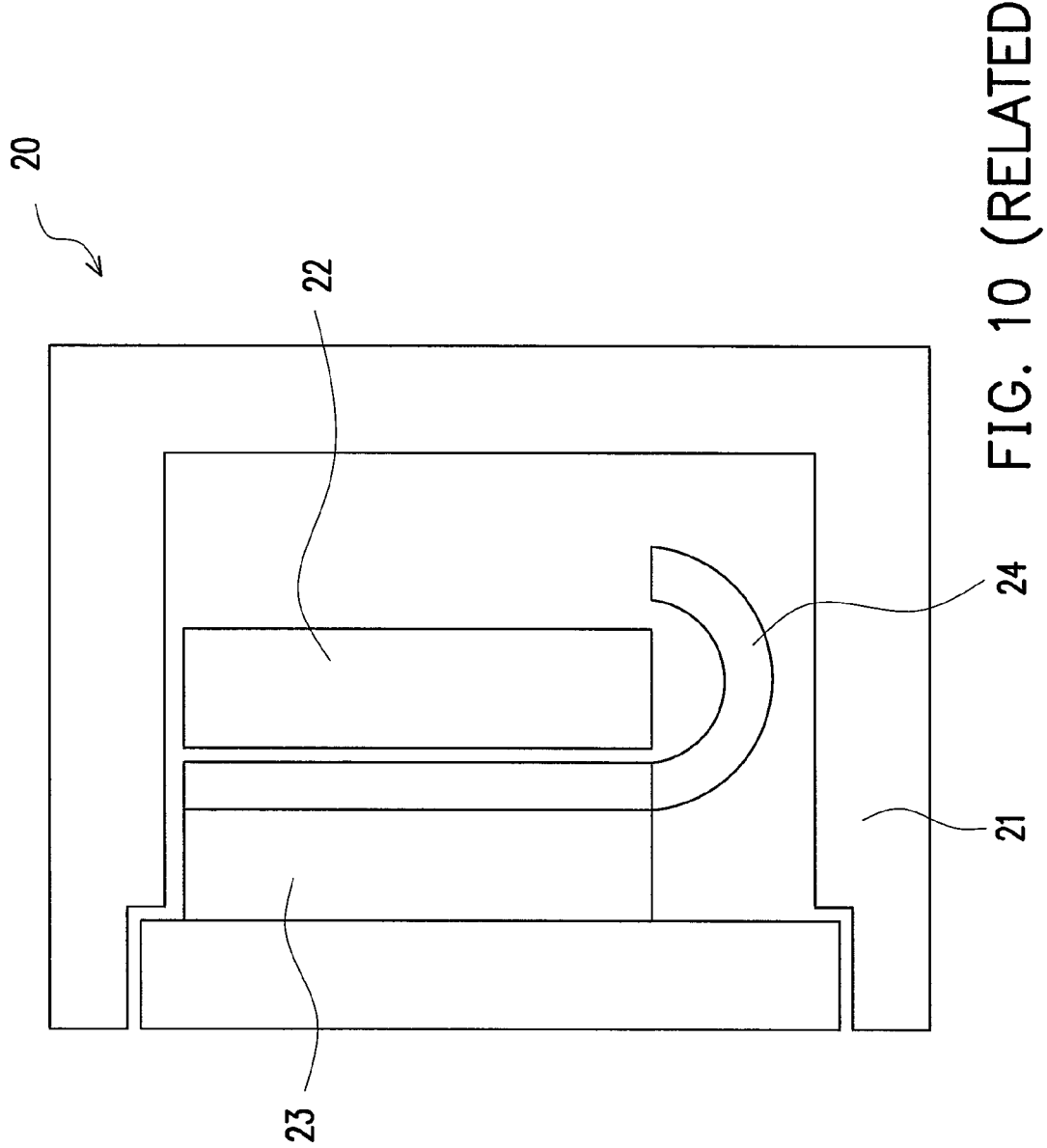
FIG. 10 is a schematic diagram illustrating a conventional touch display device.

FIG. 9 is a schematic diagram illustrating a touch panel placed within a frame according to another embodiment of the invention. Referring to FIG. 9, according to the present embodiment, the touch panel 100 is generally assembled on a housing for protecting the touch panel 100 and the circuit within, which then becomes a touch display device 30 for providing to the consumers. Since the flexible circuit board 130 of the present embodiment includes a bending segment 134, when the touch panel 100 is placed into a frame 31, detachment of the bonding segment 132 of the flexible circuit board 130 caused by a relatively larger stress generated from the flexible circuit board 130 being extruded by the frame 31 due to the insufficient space between the frame 31 and the flexible circuit board 130, may be avoided. Therefore, no additional space between the frame 31 and the touch panel 100 is required, such that the frame 31 with size equivalent to the size of the touch panel 100 may be selected to reduce the width of the frame around the touch display device 30.

In view of above, according to above embodiments of the invention, by bending the bending segment of the flexible circuit board along the bending line to reduce the space required for edges of touch panel, the width of the frame of the touch display device may be substantially reduced. Moreover, the process of bending the bending segment may also be ensured by an additional bending member.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch panel, comprising:
   a transparent substrate;
   a touch module disposed on the transparent substrate, wherein an orthographic projection of the touch module on the transparent substrate is located within an edge profile of the transparent substrate, and a distance is existed between a lateral side of the orthographic projection of the touch module on the transparent substrate and a corresponding lateral side of the transparent substrate; and
   a flexible circuit board comprising a bonding segment, a bending segment and an extending segment, wherein the bonding segment is bonded to the touch module, the bending segment is located between the bonding segment and the extending segment, the bending segment has a bending line, and the bending segment bends along the bending line.

2. The touch panel of claim 1, wherein the extending segment is extended in a direction away from the transparent substrate.

3. The touch panel of claim 1, wherein the bending segment has at least an opening, and the opening is located on the bending line.

4. The touch panel of claim 1, further comprising:
   a bending member fastened to the bending segment, wherein the bending member ensures the bending segment bends along the bending line.

5. The touch panel of claim 1, wherein the touch module comprises at least a transparent electrode layer, at least a transparent bearing layer and at least a transparent adhesive layer, the transparent electrode layer is disposed on a surface of the transparent bearing layer, and the bonding segment is sandwiched between the transparent bearing layer and the transparent adhesive layer.

6. The touch panel of claim 5, further comprising:
a bending member fastened to the bending segment, and a portion of the bending member being sandwiched between the transparent bearing layer and the transparent adhesive layer, wherein the bending member ensures the bending segment bends along the bending line.

7. A touch panel, comprising:
a transparent substrate;
a touch module disposed on the transparent substrate, comprising at least a transparent electrode layer, at least a transparent bearing layer, at least a transparent adhesive layer and an explosion-proof film, wherein the transparent electrode layer is disposed on a surface of the transparent bearing layer; and
a flexible circuit board comprising a bonding segment, a bending segment and an extending segment, wherein the bonding segment is bonded to the touch module and sandwiched between the transparent bearing layer and the transparent adhesive layer, the bending segment is located between the bonding segment and the extending segment, the bending segment has a bending line, and the bending segment bends along the bending line, and the explosion-proof film is adhered on the transparent electrode layer, the transparent bearing layer, and a portion of the bending segment by the transparent adhesive layer.

8. A touch panel, comprising:
a transparent substrate;
a touch module disposed on the transparent substrate, wherein the touch module has a touch panel view area and a touch panel active area; and
a flexible circuit board comprising a bonding segment, a bending segment and an extending segment, wherein the bonding segment is bonded to the touch module, a portion of an orthographic projection of the bonding segment on the touch module is located within the touch panel active area, and the orthographic projection of the bonding segment on the touch module is located outside of the touch panel view area, the bending segment is located between the bonding segment and the extending segment, the bending segment has a bending line, and the bending segment bends along the bending line.

* * * * *